United States Patent [19]

Brown et al.

[11] Patent Number: 4,488,051
[45] Date of Patent: Dec. 11, 1984

[54] APPARATUS FOR SENSING LINEAR AND ROTATIONAL POSITION BETWEEN A SCREW ELEMENT AND A THREADED MEMBER

[75] Inventors: James R. Brown, Huntington Beach; Roy W. Aday, Jr., Fullerton, both of Calif.

[73] Assignee: Beckman Instruments, Inc., Fullerton, Calif.

[21] Appl. No.: 334,808

[22] Filed: Dec. 28, 1981

[51] Int. Cl.³ ............................ G01D 5/34; G01J 3/18
[52] U.S. Cl. .............................. 250/561; 250/231 SE; 356/334
[58] Field of Search ............. 250/231 SE, 561, 237 G; 356/334, 328

[56] References Cited

U.S. PATENT DOCUMENTS 3,818,224  6/1974  Schmidt .................. 250/231 SE
4,117,341  9/1978  Persson .......................... 250/561
4,329,051  5/1982  Chamran et al. ............. 356/334 X Primary Examiner—Edward P. Westin
Attorney, Agent, or Firm—W. H. May; P. R. Harder; S. R. Markl

[57] ABSTRACT

Apparatus for establishing a "home" position for a load element driven axially along the lead screw. A position sensor includes a first sensor element attached for axial travel with the load element and a second sensor element attached for rotation with the lead screw. The pair of sensor elements is operatively aligned at a predetermined relative axial and rotational position establishing the "home" position.

4 Claims, 3 Drawing Figures

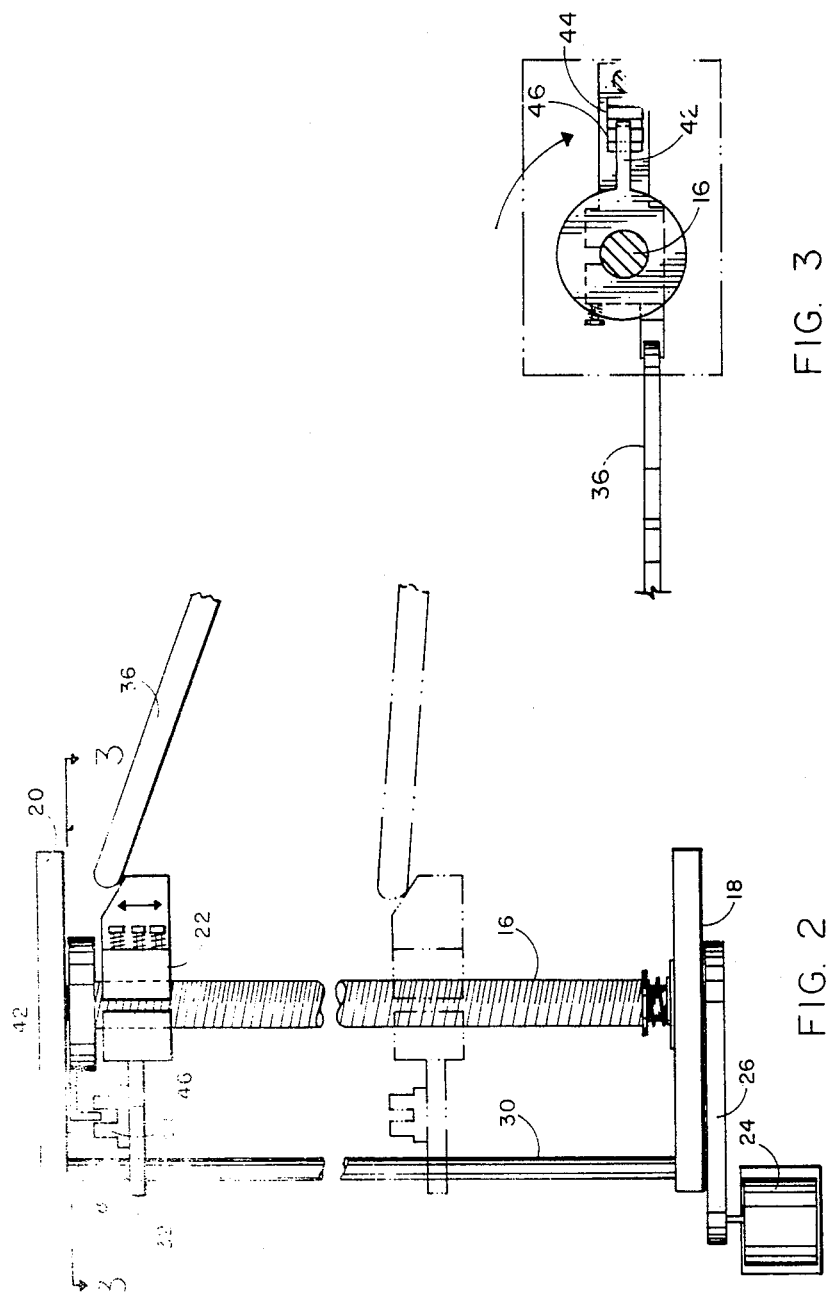

APPARATUS FOR SENSING LINEAR AND ROTATIONAL POSITION BETWEEN A SCREW ELEMENT AND A THREADED MEMBER

BACKGROUND OF THE INVENTION

1. Field of the Invention

The present invention relates to apparatus for controlling the relative position of a lead screw and a load element in threaded engagement with the lead screw.

2. Description of the Prior Art

Lead screws have long been employed for driving a load element in threaded engagement with the lead screw. Rotation of the lead screw causes corresponding linear displacement of the load element along the lead screw axis. Depending on the application, the load element may in turn be connected to a workpiece, an indicator dial, or other element whose mechanical position is to be controlled by the lead screw.

In spectrophotometry, such a lead screw drive arrangement has been used for controlling the position of a diffraction grating in a light beam. In a spectrophotometer a sample material to be analyzed is positioned in a light beam and the effect of the sample on the light is detected to provide a measure of certain characteristics of the sample. In many analytical techniques, it is desired to vary the wavelength of the light beam to allow measurement of the sample characteristics as a function of wavelength. For this purpose, the diffraction grating (or other light dispersing mechanism) is positioned in the light beam to pass only selected light wavelengths to the detector. Different wavelengths are selected by changing the position or orientation of the grating in the light beam.

In one commercially available spectrophotometer, a motor driven lead screw mechanically controls the wavelength setting of the diffraction grating. In that instrument, a load element threadingly engages the lead screw and is driven linearly along the lead screw by corresponding rotation of the lead screw. The load element, in turn, is mechanically connected to the diffraction grating by a follower arm. Linear movement of the load element along the lead screw is translated by the follower arm into corresponding rotation of the grating. By appropriate programming of the drive motor, the lead screw is driven in forward or reverse directions to successively position the diffraction grating at any of numerous wavelength settings within the operating wavelength range of the instrument.

Successful operation of the aforedescribed spectrophotometer depends upon accurate positioning of the diffraction grating at a reference wavelength or so-called "home" position. Once the reference wavelength position is set, then other wavelength settings are established by displacing the grating a given amount from the "home" position. In the commercially available instrument, two sensing switches are used to establish the "home" position of the grating—one, a coarse position switch and the other, a fine position switch. The coarse position switch is situated in the path of load element movement along the lead screw axis. The coarse position switch is tripped by arrival of the load element at a position close to the home position. When tripped, the coarse position switch conditions or sets the fine position switch for response. The fine position switch is in the path of rotation of a follower attached to the lead screw. After being set, the fine position switch is tripped by arrival of the rotating lead screw follower thereby indicating that the home position has been reached.

While the foregoing arrangement performs satisfactorily, it is unduly complex in that it requires two separate switches and associated circuitry for establishing the "home" position of the diffraction grating.

SUMMARY OF THE INVENTION

The present invention resides in apparatus for accurately positioning a lead screw load element without the drawbacks of the prior art. The improved apparatus is achieved in a form which is simple and inexpensive in construction, reliable in operation and is readily adapted for commercial application.

To the foregoing ends, the present invention is embodied in positioning apparatus comprising a lead screw, a load element, and means supporting the lead screw and the load element for relative rotational and linear movement about and along the lead screw axis. In accordance with the invention, the apparatus includes a position sensor comprising: (1) first and second cooperating position sensing elements carried, respectively, by the lead screw and by the load member and (2) means for indicating operative alignment of the position sensing elements in a predetermined position. In this manner a single position sensor comprising cooperating elements carried by the lead screw and load member provides for precise linear and rotational positioning of the element at a "home" or reference position.

In the preferred embodiment of the invention, the apparatus includes means supporting the first position sensing element on the load member for axial travel therewith and means supporting the second position sensing element on the lead screw for rotation therewith. In this manner the two positioning elements are disposed for operative alignment or engagement at predetermined respective axial and rotational positions which together define the "home" position of the load element.

In the preferred embodiment the position sensor is an optical sensor one element of which, in the aligned position, intercepts an optical path in the other element to generate a control signal indicating that the "home" position has been reached.

BRIEF DESCRIPTION OF THE DRAWINGS

FIG. 2 is a top plan view of the apparatus of FIG. 1 illustrating engagement of first and second position sensing elements of the invention.

FIG. 3 is a section taken in the direction of line 3—3 in FIG. 2 illustrating the engagement of the position sensing elements.

DESCRIPTION OF THE PREFERRED EMBODIMENT

Figure 1:
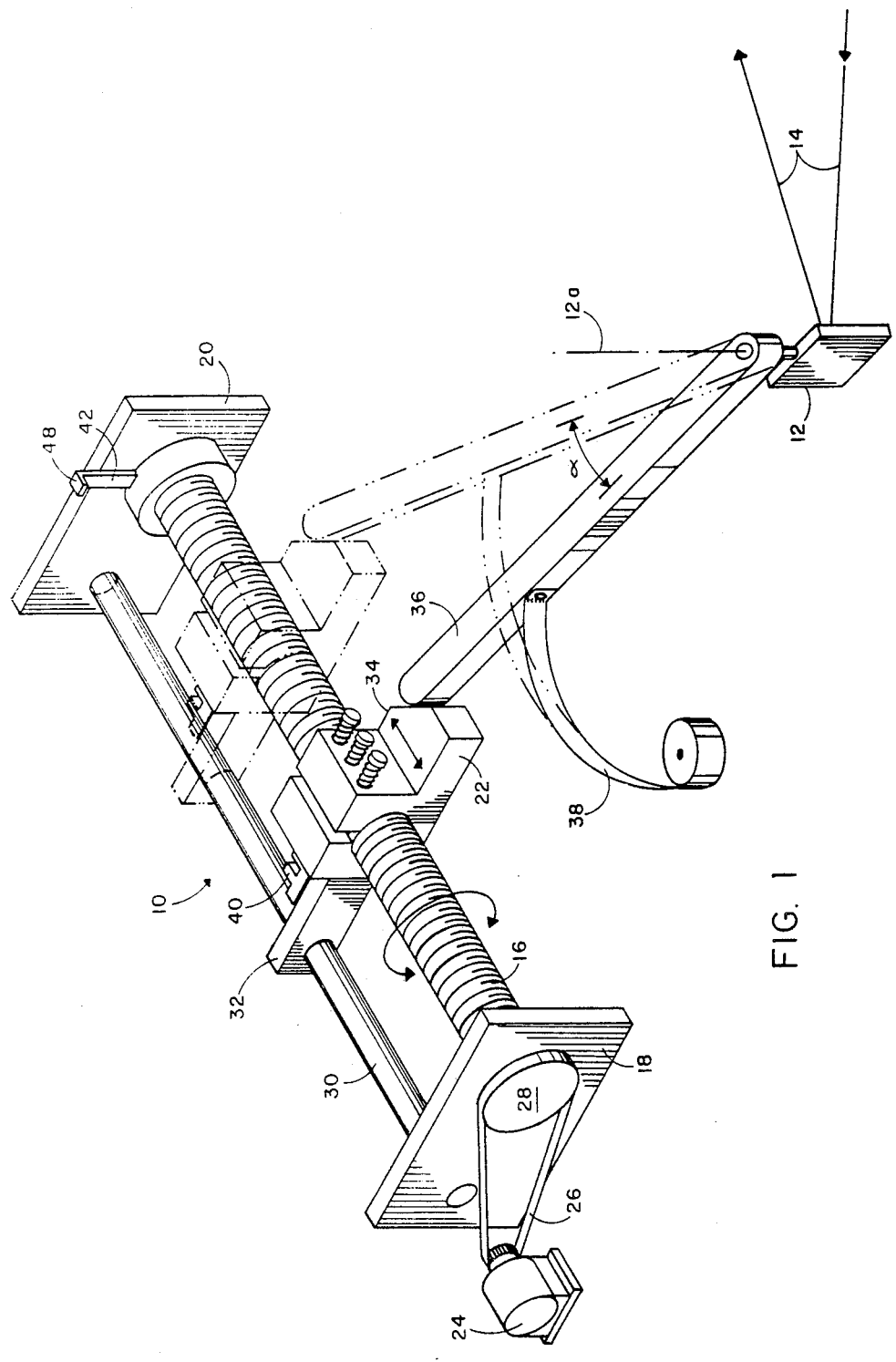
FIG. 1 is a perspective view of the positioning apparatus of the invention as incorporated in a spectrophotometer for controlling the position of a diffraction grating therein. The figure illustrates in solid outline a lead screw and a lead screw load element and, in phantom outline, a second position of the load element along the lead screw.

As illustrated in FIG. 1, positioning apparatus, indicated generally by numeral 10, is provided for controlling the position of a diffraction grating 12 in a spectrophotometer light beam path 14 so as to control the wavelength of light passed along the path toward a detector (not shown). To this end, the positioning apparatus includes a lead screw 16 supported for rotation at its opposite ends by frame pieces 18 and 20. A load member 22 is supported in threaded engagement with the lead screw and is adapted to travel in an axial or longitudinal direction along the lead screw in response to lead screw rotation.

A bidirectional stepper motor 24 is coupled via drive belt 26 to a drive pulley 28 connected to one end of the lead screw. The stepper motor is controlled in a conventional manner for rotating the lead screw either clockwise or counterclockwise. Rotation of the lead screw drives load element 22 in a longitudinal direction either forward or rearward along the lead screw.

A guide rod 30 aligned parallel to lead screw 16 is rigidly affixed at its opposite ends to frame pieces 18 and 20. An integral arm 32 of the load member is supported in sliding engagement around guide rod 30. In this manner the guide rod 30 and arm 32 cooperate to support and guide linear travel of the load member 22 in an axial direction along the lead screw and to prevent rotation of the load member.

Load member 22 includes a camming surface 34 engaging one end of a load element follower arm 36. The opposite end of the follower arm is pivoted about the axis of rotation 12a of grating 12. The grating is connected to the follower arm for rotation therewith. A return spring 38 biases the follower arm in a counterclockwise direction, as viewed in FIG. 1, about axis 12a. By virtue of this arrangement, axial movement of load member 22 along the lead screw 16 produces corresponding rotational motion of load follower arm 36 about axis 12a thereby rotating grating 12 in light path 14. As illustrated in FIG. 1, axial travel of load member 22 between the solid outline position and the phantom outline position causes corresponding rotation of the follower arm 36, and hence of the grating 12, through angle α.

In accordance with a primary aspect of the present invention, a position sensor is provided to establish a predetermined "home" or reference position for the load element 22 and hence for the diffraction grating 14. The position sensor is comprised of first and second cooperating position sensing elements 40 and 42 carried, respectively, by load member 22 and lead screw 16. The first position sensing element 40 is secured to integral arm 32 of load member 22 and hence travels with the load element in an axial direction along the lead screw. The second position sensing element 42 comprises an arm or flag secured to and extending generally perpendicularly from lead screw 16. This arm is affixed to the lead screw at a predetermined axial position thereon so as to be rotatable with the lead screw at such position.

In the preferred embodiment first element 40 is an optical sensor, itself of conventional configuration. Referring to FIGS. 2-3, element 40 is of generally U-shaped configuration having a pair of legs 44 and 46 spaced from one another and extending in the direction of the lead screw axis. Legs 44 and 46 house, respectively, a light source and a light detector. A light path, generally perpendicular to the lead screw axis, is defined between legs 44 and 46 by the source and detector.

The radially outward end of second element 42 is formed as a lip or flange 48 aligned generally parallel to the lead screw axis at a radial distance from the axis equal to corresponding radial distance of the first position sensing element 40.

Thus arranged, referring to FIGS. 2 and 3, the lip 48 of position sensing element 42 is adapted to intercept and hence block the optical path between legs 44 and 46 of the first position sensing element 40. It will be apparent that the first and second position sensing elements 40 and 42 will be so aligned with respect to each other in the position illustrated in FIG. 2 only when (1) element 40 is at the predetermined axial position along the lead screw illustrated in FIG. 2, and (2) element 42 is at the predetermined rotational position illustrated in FIG. 3. This is the "home" or reference position of the load element 22 and grating 12. When this position is reached, sensor circuitry (not shown) coupled to element 40 detects the interruption of the optical path by element 42 and generates a control signal endicative of the arrival of load element 20 at the "home" position. The control signal is then applied in a conventional manner to inhibit stepper motor 24.

In operation, the control system energizes stepper motor 24 which rotates lead screw 16 for driving the load element 22 toward its "home" position. During relative movement of the lead screw and load element, position sensor element 42 rotates with the lead screw while sensor element 40 moves axially with the load element toward the sensing element 42. When the relative axial and rotational position of the elements 40 and 42 is such that lip 48 intercepts the optical path between legs 44 and 46, the "home" or reference wavelength position will have been reached. At such time the control signal is generated as previously described for inhibiting operation of motor 24. Thereafter, the stepper motor 24 is pulsed with a predetermined number of drive pulses for driving grating 12 through a desired angle of rotation to a new wavelength setting.

It is evident from the foregoing that the present position sensing arrangement greatly simplfies the "home" position sensing elements allowing a single position sensor to perform the heretofore performed coarse and fine positioning.

While a preferred embodiment of the invention has been illustrated and described, modifications may be made therein without departing from the invention as defined in the appended claims.

What is claimed is:

1. Positioning apparatus comprising:
  a lead screw;
  a load member;
  means supporting the lead screw and load member for relative rotational and linear movement about and along the lead screw axis; and
  a position sensor including:
    a position sensing means carried by the load member for sensing linear position of said load member and rotational position of said lead screw and a position indicating means carried on said lead screw for non-contacting communication with said position sensing means when said load member arrives in a selected position along said lead screw, with relative rotational and linear movement between said position sensing means and said position indicating means; and
    means for indicating communication of the position sensing means and the position indicating means when they are in a predetermined relative rotational and linear position.

2. The positioning apparatus of claim 1 including:
  means for rotatably driving the lead screw, the load member being supported for travel axially along the lead screw in response to the driving rotation thereof;

means supporting the first position sensing element on the load member for axial travel therewith; and means supporting the second position sensing element on the lead screw for rotation therewith.

3. The positioning apparatus of claim 1 wherein the position sensing means in an optical sensor.

4. The positioning apparatus of claim 3 in which the position indicating means intercepts an optical path in the position sensing means for generating a control signal indicating that the position sensing means and the position indicating means are aligned in the predetermined relative rotational and linear position.

* * * * *